United States Patent [19]
Stafford, Jr.

[11] 3,731,974
[45] May 8, 1973

[54] SHOCK ABSORBER FOR TILT-TYPE TRAILER

[76] Inventor: George T. Stafford, Jr., P.O. Box 2805, Birmingham, Ala. 35212

[22] Filed: Apr. 30, 1971

[21] Appl. No.: 138,974

[52] U.S. Cl. ............... 298/17 R, 298/5, 298/38, 188/67
[51] Int. Cl. ............... B60p 1/24
[58] Field of Search ............... 298/38, 5, 17; 214/505, 506; 188/129, 67

[56] References Cited

UNITED STATES PATENTS

| | | |
|---|---|---|
| 3,160,439 | 12/1964 | Kazakowitz ............... 298/17 B |
| 513,132 | 1/1894 | McClanathan ............... 298/38 X |
| 1,508,346 | 9/1924 | Montgomery ............... 188/129 |
| 2,867,474 | 1/1959 | Linn ............... 298/38 X |
| 3,011,670 | 12/1961 | Chatterton ............... 214/505 |

Primary Examiner—Richard J. Johnson
Attorney—Jennings, Carter & Thompson

[57] ABSTRACT

Upstanding plates mounted between tilt type trailer bed and draw bar frame with adjacent surfaces of plates slidably engaging each other. At least one plate is carried by the draw bar frame and at least another one of plates is carried by the trailer bed. Adjustable means retains adjacent plates in frictional contact with each other and restrains relative movement between adjacent plates as trailer bed moves toward tilted position.

4 Claims, 4 Drawing Figures

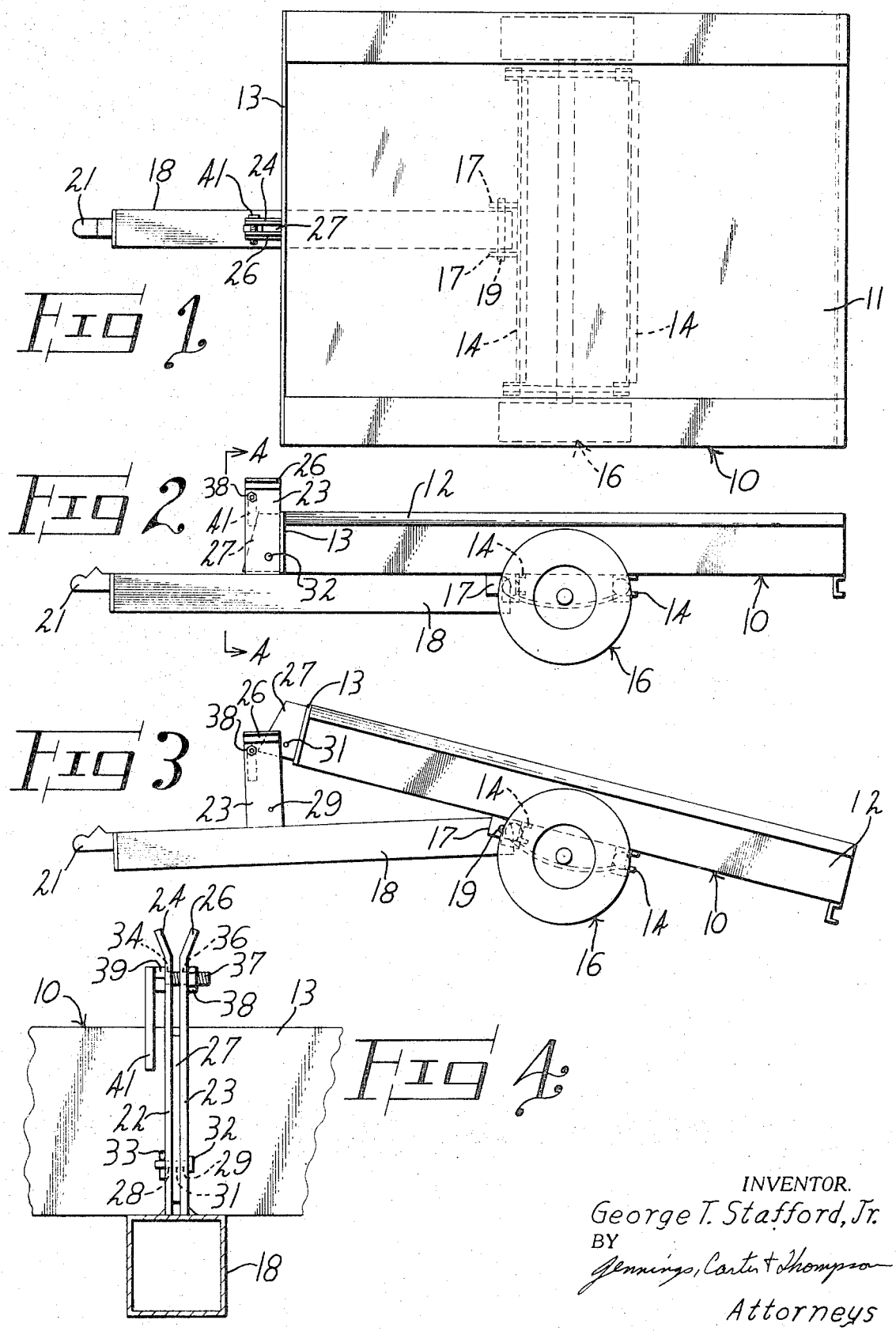

SHOCK ABSORBER FOR TILT-TYPE TRAILER

BACKGROUND OF THE INVENTION

This invention relates to a shock absorber for a tilt-type trailer and more particularly to a friction-type shock absorber which is interposed between a pivotally mounted trailer bed and a draw bar frame therefor.

As is well known in the art to which my invention relates, many complicated devices have been employed with tilt-type trailers for restraining pivotal movement of the trailer bed toward unloading position. Such devices usually include complicated fluid pressure operated mechanism which controls pivotal movement of the trailer bed. Such apparatus is not only complicated in structure but is difficult to install and requires a fluid pressure operated system, thus adding further to the overall expense of operation.

BRIEF SUMMARY OF THE INVENTION

My present invention includes upstanding plate-like members mounted between a tiltable trailer bed and a draw bar frame therefor with adjacent surfaces of the plate-like member slidably engaging each other. At least one plate-like member is carried by the draw bar frame while at least another one of the plate-like members is carried by the trailer bed. Adjustable restraining means holds the adjacent plate-like members in frictional contact with each other to thus restrain relative movement between the adjacent plates as the trailer bed moves about its pivot toward tilted position.

Apparatus embodying features of my invention is illustrated in the accompanying drawing, forming a part of this application, in which:

FIG. 1 is a top plan view showing my improved shock absorber unit mounted on a tilt-type trailer;

FIG. 2 is a side elevational view thereof showing the trailer bed locked in operating position;

FIG. 3 is a side elevational view showing the trailer bed moved to a tilted position; and, FIG. 4 is an enlarged, fragmental view taken generally along the line 4—4 of FIG. 2.

Referring now to the drawing for a better understanding of my invention, I show a tilt-type trailer bed 10 having a bottom 11, side walls 12 and a front wall 13. The rear end of the trailer bed 10 may be left open or may be closed by a suitable closure member, if desired.

Secured rigidly to the under surface of the bottom wall 11 are transverse frame members 14 which are connected to a wheel and axle unit indicated generally at 16. Secured rigidly to the forwardmost frame member 14, adjacent the center of the trailer bed 10, are forwardly extending support brackets 17 which are spaced from each other, as shown in FIG. 1, for receiving the rear end of a draw bar frame 18. Suitable aligned openings are provided through the support brackets 17 and the rear end of the draw bar frame 18 for receiving a pivot pin 19 whereby the trailer bed 10 is adapted to move from the horizontal, operating position shown in FIG. 2 to the tilted, unloading position shown in FIG. 3. The forward end of the draw bar frame 18 carries a conventional type trailer hitch 21 whereby the draw bar may be detachably connected to a vehicle in a manner well understood in the art to which my invention relates.

My improved apparatus for restraining pivotal movement of the trailer bed 10 from the horizontal operative position to the tilted or unloading position will now be described. Secured rigidly to the upper surface of the draw bar frame 18 by suitable means, such as by welding are spaced apart, upstanding plate-like members 22 and 23 having outwardly flaring upper ends 24 and 26, respectively, for receiving an upstanding plate-like member 27 secured rigidly to the forward, central portion of the trailer bed 10, as shown. The upstanding plates 22, 23 and 27 extend parallel to each other with adjacent surfaces thereof in sliding contact with each other, as shown in FIG. 4.

Transversely aligned openings 28 and 29 are provided in the lower portions of the upstanding plates 22 and 23, as shown in FIG. 4. A transverse opening 31 is provided in the lower portion of the upstanding plate 27 in position to move into alignment with the openings 28 and 29 when the trailer bed 10 is moved to the horizontal, operating position. A transverse locking member 32 extends through the aligned openings 28, 29 and 31 to thus secure the forward end of the trailer bed 10 to the draw bar frame 18 while the trailer bed is in the horizontal, operating position. A suitable cotter pin 33 passes through the end of the locking element 32 to hold the locking element in place while the trailer is in use.

Aligned openings 34 and 36 are provided in the upper, forward portion of the upstanding brackets 22 and 23, as shown in FIG. 4, for receiving an elongated member 37 having external threads which engage the internal threads of a nut 38 which is secured rigidly to the side of the upstanding member 23, as shown in FIG. 4. The end of the elongated member 37 projecting outwardly of the upstanding member 22 carries a head 39 which is adapted to rotate relative to the adjacent surface of the upstanding member 22. An operating handle 41 is secured rigidly to the head 39 whereby rotary motion may be imparted to the elongated threaded member 37.

From the foregoing description, the operation of my improved shock absorber unit for a tilt-type trailer will be readily understood. To retain the trailer bed 10 in the horizontal, operating position, the forward end of the trailer bed is moved downwardly to align the opening 31 with the opening 28 and 29 carried by the upstanding plate-like members 22 and 23. The locking pin 32 is then inserted through the aligned openings 28, 29 and 31 and the cotter pin 33 is then passed through the opening in the end of the locking pin 32 to thus assure positive locking of the forward end of the trailer bed to the draw bar frame 18. To further secure the forward end of the trailer bed 10 to the draw bar frame 18, the handle member 41 is rotated in a direction to draw the upstanding plate-like members 22 and 23 toward each other to thus firmly grip the upstanding plate-like member 27 therebetween.

To move the trailer bed 10 from the horizontal, operative position to a tilted position for unloading the trailer, the locking pin 32 is removed from the openings 28, 29 and 31 whereby the forward end of the trailer is then held in place only by the frictional engagement between the sides of the upstanding plate-like members 22 and 23. The handle member 41 is rotated slowly until the plate-like member 27 slids upwardly relative to the plate-like members 22 and 23. The rate of upward movement of the plate-like member 27 is controlled by rotating the handle member 41 to thus retain the plate-like members 22 and 23 at selected positions relative to the plate-like member 27. Accordingly, the trailer bed 10 moves slowly from the horizontal, operating position to the tilted position in a controlled manner.

From the foregoing, it will be seen that I have devised an improved shock absorber unit for a tilt-type trailer. By providing a shock absorber unit and a locking element which positively retains the forward end of the tilt-type trailer bed in operating position, there is no chance of the trailer moving toward tilted position while in use. Also, by providing adjustable means for varying the amount of movement permitted between the forward end of the trailer bed and the draw bar frame, the trailer bed moves slowly in a controlled manner from the horizontal position to the tilted position. Furthermore, by providing a shock absorber unit which is controlled by varying the frictional contact pressure between the adjacent sliding surfaces of the upstanding members, I eliminate entirely the necessity of providing complicated, fluid pressure units for controlling the pivotal movement of the trailer bed.

While I have shown my invention in but one form, it will be obvious to those skilled in the art that it is not so limited, but is susceptible of various other changes and modifications without departing from the spirit thereof.

What I claim is:

1. In a shock absorber for a tilt type trailer having a trailer bed pivotally connected to a frame unit having a forwardly extending draw bar:
   a. upstanding plate-like members extending parallel to each other with adjacent surfaces thereof disposed to slidably engage each other,
   b. means securing at least one of said plate-like members to said frame unit,
   c. means securing at least another one of said plate-like members to said trailer bed,
   d. adjustable means retaining adjacent plate-like members in frictional engagement with each other to restrain relative movement between said one plate-like member and said another of said plate-like members whereby pivotal movement of said trailer bed is controlled, and
   e. a pin-like member passing through aligned openings in said plate-like members releasably connecting said plate-like members to each other to limit relative movement between said plate-like members.

2. In a shock absorber for a tilt type trailer having a trailer bed pivotally connected to a frame unit having a forwardly extending draw bar:
   a. a first absorber unit comprising an upstanding plate-like member,
   b. another absorber unit comprising upstanding spaced apart plate-like members slidably receiving therebetween said plate-like member of said first absorber unit with said plate-like members extending parallel to each other
   c. means securing one of said absorber units to said trailer bed,
   d. means securing the other absorber unit to said frame unit,
   e. an elongated member passing through aligned openings in said spaced apart plate-like members and out of engagement with said plate-like member of said first absorber unit, and
   f. adjustable means carried by said elongated member and engagable with said spaced apart plate-like members to retain said spaced apart members at selected positions relative to each other and restrain relative movement between the absorber units whereby pivotal movement of said trailer bed is controlled.

3. A shock absorber for a tilt type trailer as defined in claim 2 in which said elongated member is an externally threaded member which engages an internally threaded member carried by one of said spaced apart plate-like members.

4. A shock absorber for a tilt type trailer as defined in claim 3 in which an actuating handle is carried by said threaded member.

* * * * *